United States Patent
Datas et al.

(10) Patent No.: US 11,267,585 B2
(45) Date of Patent: Mar. 8, 2022

(54) METHOD FOR ASSEMBLING AN AIRCRAFT FUSELAGE SECTION FROM TWO SUPERPOSED UPPER AND LOWER PARTS, MULTIPURPOSE MOUNTING SUPPORT, GEAR AND FUSELAGE SECTION PRODUCTION UNIT FOR IMPLEMENTING SAID METHOD

(71) Applicants: Airbus Operations SAS, Toulouse (FR); Airbus SAS, Blagnac (FR)

(72) Inventors: Jean-Marc Datas, Toulouse (FR); Jean-Mickael Brindeau, Blagnac (FR); André Aquila, Cornebarrieu (FR); Patrick Guibert, Plaisance du Touch (FR)

(73) Assignees: Airbus Operations SAS, Toulouse (FR); Airbus SAS, Blagnac (FR)

( * ) Notice: Subject to any disclaimer, the term of this patent is extended or adjusted under 35 U.S.C. 154(b) by 0 days.

(21) Appl. No.: 16/580,932

(22) Filed: Sep. 24, 2019

(65) Prior Publication Data

US 2020/0094991 A1 Mar. 26, 2020

(30) Foreign Application Priority Data

Sep. 25, 2018 (FR) ...................................... 1858741

(51) Int. Cl.
*B64F 5/10* (2017.01)
*B64F 5/50* (2017.01)
(Continued)

(52) U.S. Cl.
CPC ................ *B64F 5/10* (2017.01); *B64C 1/069* (2013.01); *B64F 5/50* (2017.01); *B23P 11/00* (2013.01);
(Continued)

(58) Field of Classification Search
CPC ... B64F 5/10; B64F 5/50; B64C 1/069; B64C 1/061; B64C 1/064; B64C 1/12;
(Continued)

(56) References Cited

U.S. PATENT DOCUMENTS 5,920,974 A * 7/1999 Bullen ................... B23Q 1/015
29/33 K
6,121,781 A 9/2000 Martinez
(Continued)

FOREIGN PATENT DOCUMENTS

CN 201423426 Y 3/2010
DE 202017105281 U1 9/2017
(Continued)

OTHER PUBLICATIONS

French Search Report; priority document FR 1858741; dated May 9, 2019.

*Primary Examiner* — Sarang Afzali
*Assistant Examiner* — Darrell C Ford
(74) *Attorney, Agent, or Firm* — Greer, Burns & Crain, Ltd.

(57) ABSTRACT

A method for assembling a fuselage section which comprises producing a lower part of the section from at least two panels and an upper part of the section from at least two panels, then assembling the lower and upper parts so as to obtain the fuselage section. A lower or upper mounting support, a gear and a production unit are used in the method.

5 Claims, 9 Drawing Sheets

(51) Int. Cl.
  *B64C 1/06* (2006.01)
  *B64C 1/12* (2006.01)
  *B23P 11/00* (2006.01)
  *B23P 13/00* (2006.01)
(52) U.S. Cl.
  CPC ............... *B23P 13/00* (2013.01); *B64C 1/061* (2013.01); *B64C 1/064* (2013.01); *B64C 1/12* (2013.01); *B64C 2211/00* (2013.01); *Y10T 29/49622* (2015.01); *Y10T 29/49826* (2015.01)
(58) Field of Classification Search
  CPC ........... B64C 2211/00; Y10T 29/49622; Y10T 29/49826; B23P 11/00; B23P 13/00; B23K 2101/006; B23K 2101/06; B23K 37/0408; B23K 37/0426; B23K 37/053; B21J 15/142; B21J 15/42
  USPC .......................................................... 29/430
  See application file for complete search history.

(56) References Cited

U.S. PATENT DOCUMENTS

| | | | | |
|---|---|---|---|---|
| 6,481,096 | B2* | 11/2002 | Lehmker | B21J 15/142 29/721 |
| 7,731,207 | B2* | 6/2010 | Santos Gomez | B64F 5/50 280/79.11 |
| 9,090,357 | B2* | 7/2015 | Oberoi | B64F 5/50 |
| 11,035,135 | B2* | 6/2021 | Phan | E04F 11/1865 |
| 2001/0054228 | A1* | 12/2001 | Lehmker | B23P 19/04 29/701 |
| 2006/0108058 | A1* | 5/2006 | Chapman | B29C 70/386 156/245 |
| 2010/0031509 | A1* | 2/2010 | Frauen | B64F 5/10 29/897.2 |
| 2010/0233373 | A1* | 9/2010 | Swanberg | B64F 5/10 427/300 |
| 2013/0019446 | A1 | 1/2013 | Venskus et al. | |
| 2013/0152397 | A1* | 6/2013 | Oberoi | B64F 5/10 29/897.2 |
| 2015/0083860 | A1 | 3/2015 | Frauen et al. | |
| 2018/0043452 | A1 | 2/2018 | Daney | |
| 2019/0030588 | A1* | 1/2019 | Hirai | B21J 15/42 |
| 2021/0206513 | A1* | 7/2021 | Adamson | B64F 5/10 |

FOREIGN PATENT DOCUMENTS

| | | |
|---|---|---|
| EP | 2853495 A1 | 4/2015 |
| FR | 2788743 A1 | 7/2000 |

\* cited by examiner

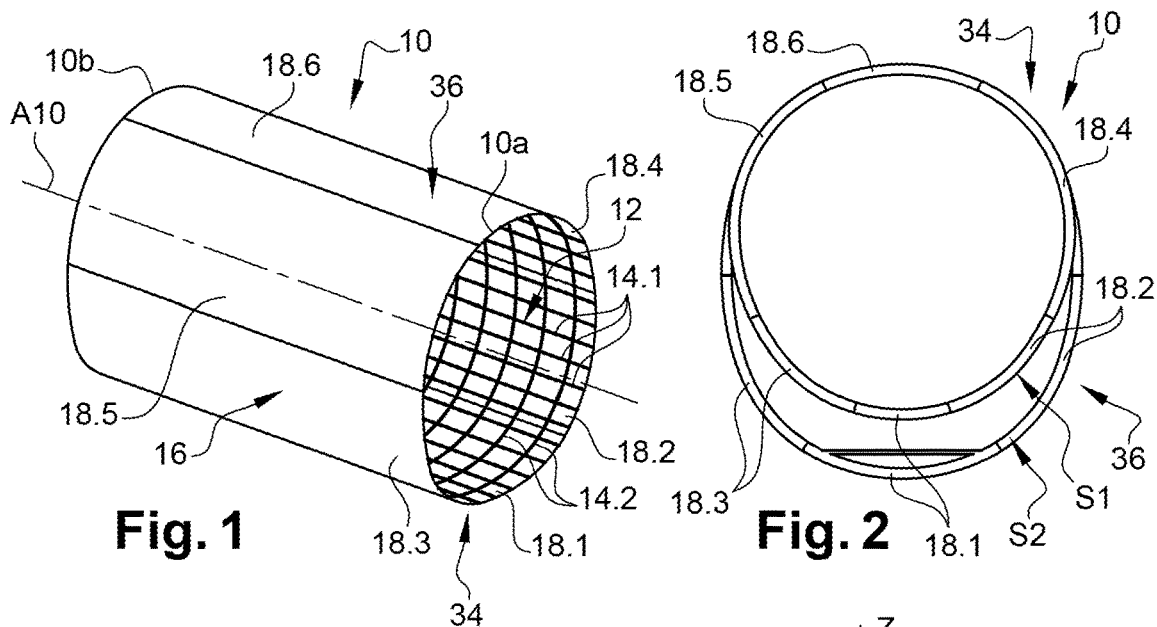
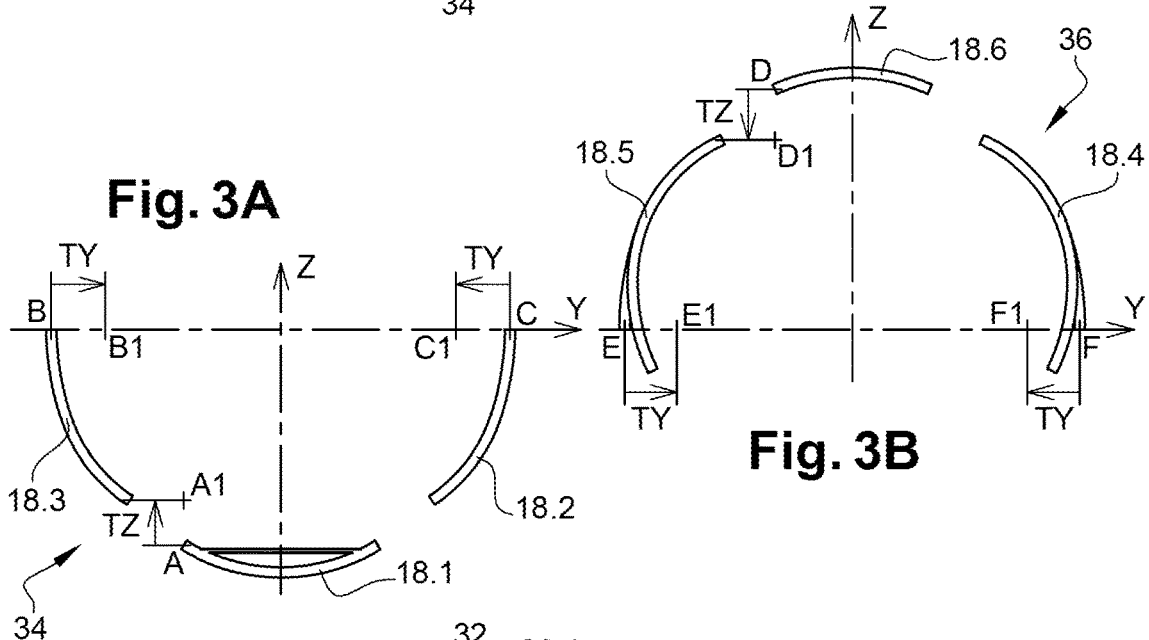
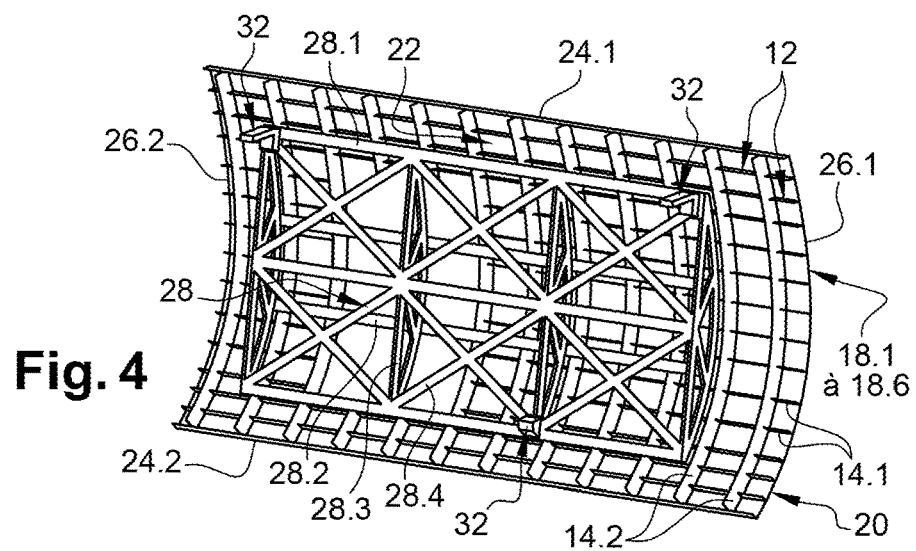

Fig. 15

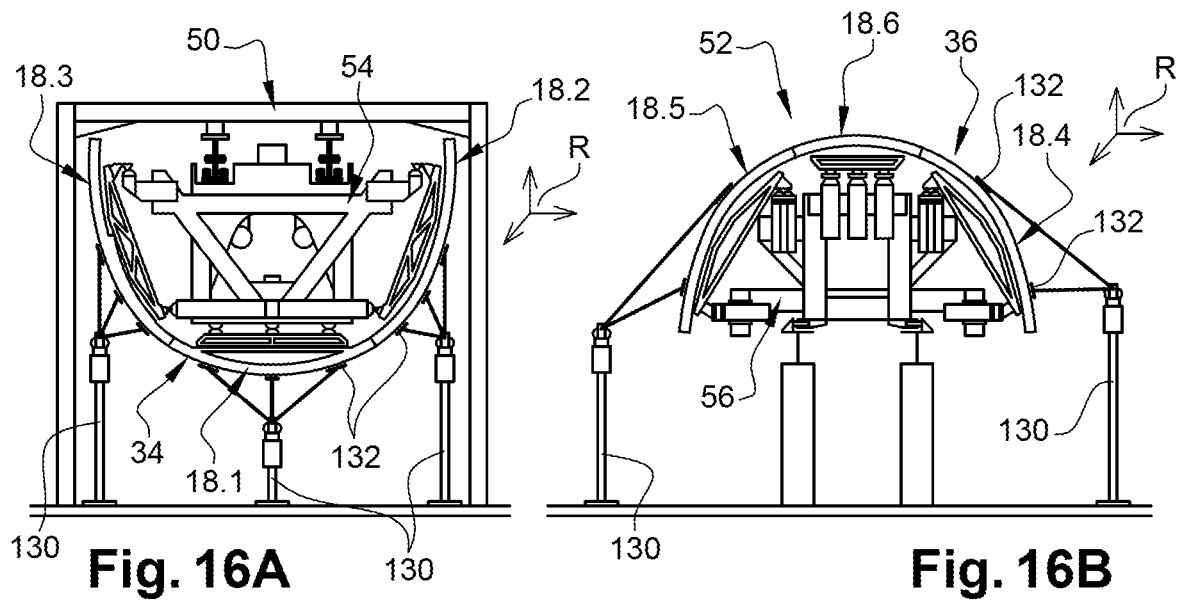
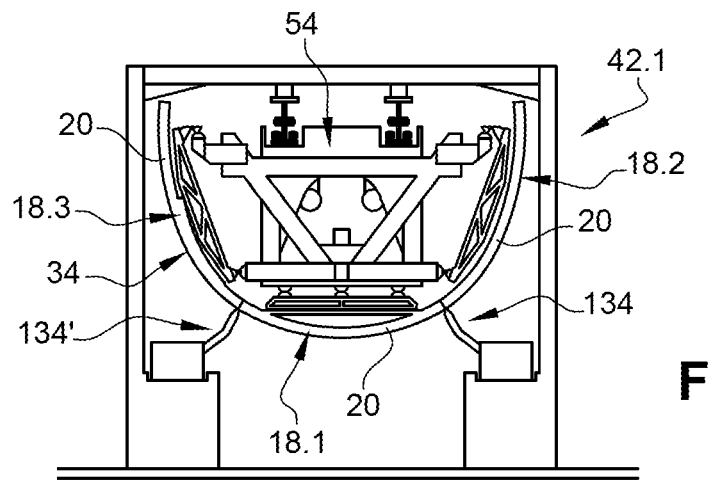
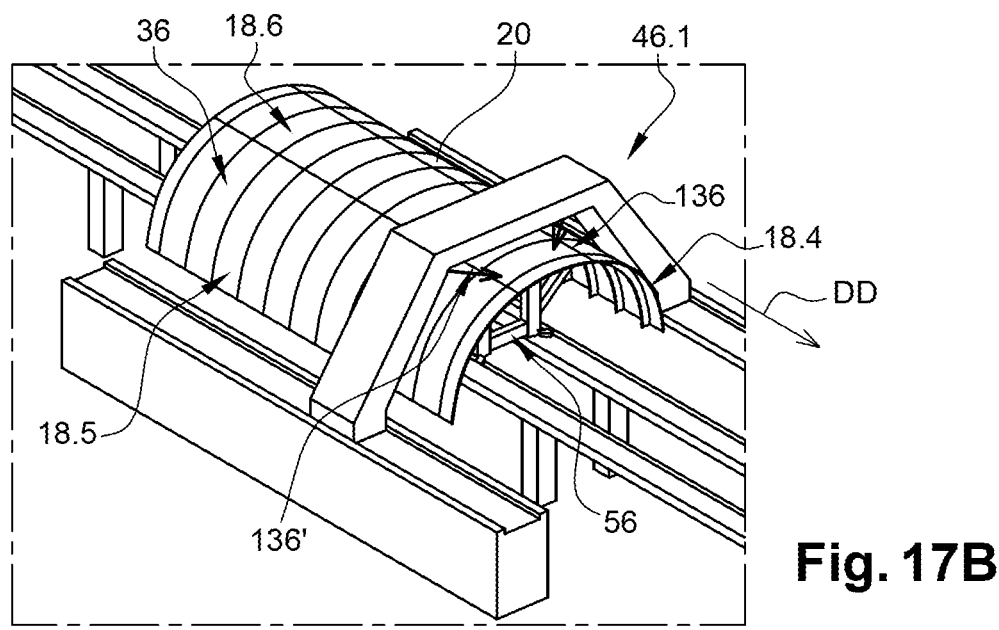

METHOD FOR ASSEMBLING AN AIRCRAFT FUSELAGE SECTION FROM TWO SUPERPOSED UPPER AND LOWER PARTS, MULTIPURPOSE MOUNTING SUPPORT, GEAR AND FUSELAGE SECTION PRODUCTION UNIT FOR IMPLEMENTING SAID METHOD

CROSS-REFERENCES TO RELATED APPLICATIONS

This application claims the benefit of the French patent application No. 1858741 filed on Sep. 25, 2018, the entire disclosures of which are incorporated herein by way of reference.

FIELD OF THE INVENTION

The present application relates to a method for assembling an aircraft fuselage section from two superposed upper and lower parts, to a multipurpose mounting support and to a gear used for implementing the method and to a fuselage section production unit for implementing the method.

BACKGROUND OF THE INVENTION

For the present application, a longitudinal direction is parallel to the axis of an aircraft fuselage which extends approximately between a nose cone and a tail cone of the fuselage. A transverse plane is at right angles to the longitudinal direction.

The fuselage comprises a structure composed of longitudinal and transverse stiffening pieces and a skin added on to the structure. The fuselage is obtained by assembling several sections end-to-end, each obtained by assembling several panels depending on the transverse section of the fuselage. Thus, for civilian airplanes having a small transverse section, the sections are obtained by assembling two upper and lower panels whereas, for civilian airplanes having a significant transverse section, the sections are obtained by assembling four panels, upper and lower panels, between which lateral panels are inserted.

According to one procedure, the panels are produced in a first production unit and then are transferred to a second production unit in which they are assembled so as to form fuselage sections.

This second production unit comprises several stations at each of which, in turn, the fuselage section and/or one or more part(s) of the fuselage section are immobilized.

According to one embodiment, the fuselage section and/or the part(s) of the fuselage section are displaced from one station to the other using a traveling overhead crane or a trolley and are positioned at each of the stations on a mounting support resting on the ground around which are arranged platforms and catwalks for access for the operators.

According to this embodiment, there are as many mounting supports as stations, these mounting supports being different from one family of airplanes to another. Consequently, each production unit is dedicated to one family of airplanes, which tends to increase the number of production units. Furthermore, depending on the airplanes to be produced for each family, one production unit may be underused whereas the others are at their maximum production capacities.

The present invention aims to remedy all or some of the drawbacks of the prior art.

SUMMARY OF THE INVENTION

To this end, the subject of the invention is a method for assembling a fuselage section from several panels, wherein it comprises:

steps of positioning and of joining at least two panels so as to obtain a lower part of the section, the panels of the lower part of the section being secured to a lower mounting support configured to be displaced along a first path, steps of positioning and of joining at least two panels so as to obtain an upper part of the section, the panels of the upper part of the section being secured to an upper mounting support configured to be displaced along a second path, a step of displacement of at least one of the lower or upper mounting supports so that the upper mounting support is positioned above the lower mounting support, steps of positioning and of joining the lower and upper parts of the section so as to obtain the fuselage section, and steps of mold-stripping and of discharging of the fuselage section produced.

The production of the fuselage section by assembling lower and upper parts of the section, each of them being obtained by assembling at least two panels, makes it possible, whatever the section of the fuselage section (and therefore the family of airplanes), to be able to use the same assembly method, the same gear and the same production unit. Thus, one and the same production unit can be used to assemble fuselage sections of different families of airplanes.

According to another feature, the method comprises, for each lower or upper mounting support, a step of checking of the positioning of each panel and a step of correcting the positioning of each panel by virtue of a link, linking each panel and one of the lower and upper mounting supports, configured to make it possible to adjust the positioning of each panel according to a desired configuration and to immobilize the panels with respect to the lower and upper mounting supports according to the desired configuration.

According to another feature, i) each panel is removably linked to a framework equipped with at least three panel interfaces; ii) each lower or upper mounting support comprises at least one frame that is mobile along the first or second path and, for each panel, at least three support interfaces each linked via a link that is adjustable in three directions orthogonal to the frame; and iii) the step of positioning of each panel on one of the lower and upper mounting supports consists in making each panel interface cooperate with one of the support interfaces in a centered position so that the position of each panel with respect to one of the lower and upper mounting supports is known.

According to another feature, the upper mounting support is transferred on the first path where the steps of positioning and of joining of the lower and upper parts of the section are performed.

According to another feature, the first and second paths each describe a closed loop and the loop, formed by the first or second path where the step of positioning and of joining of the lower and upper parts of the section is performed, is open to allow the step of discharging of the fuselage section produced.

Another subject of the invention is a gear for implementing the method for assembling a fuselage section according to one of the preceding features, wherein the gear comprises a lower or upper mounting support comprising a frame and, for each panel, at least three support interfaces each linked to the frame via a link that is adjustable in three orthogonal directions and, for each panel, a framework configured to be removably linked to the panel and limit the deformations thereof during transportation, equipped with at least three panel interfaces each configured to cooperate with a support interface in a centered position.

According to another feature, the frame is telescopic and comprises a front frame, a rear frame and a telescopic link, linking the front and rear frames, configured to occupy a mobile state in which the telescopic link makes it possible to increase or reduce the separation of the front and rear frames and a blocked state in which the telescopic link holds the front and rear frames in a given position.

According to another feature, the lower or upper mounting support comprises at least one vertical displacement system configured to displace the frame vertically.

According to another feature, each vertical displacement system comprises a body, to which are linked two guiding systems for the lower or upper mounting support with respect to the first or second path, and at least one vertical runner configured to link the body to the frame.

According to another feature, each lower or upper mounting support comprises stress sensors making it possible to determine at least one stress exerted by each panel on the lower or upper mounting support.

According to another feature, for at least some pairs of support and panel interfaces, the support interface and/or the panel interface comprises a system for immobilization in the centered position.

According to another feature, each pair of support and panel interfaces comprises a male part and a female part comprising an abutment, the male part being configured to be introduced in a direction of introduction into the female part until it comes into contact with the abutment in the centered position, the male and female parts being configured so that, when the male part is in the centered position, the male part is immobilized with respect to the female part in a plane at right angles to the direction of introduction and cannot be translated in the direction of introduction.

Another subject of the invention is a production unit for implementing the method for assembling a fuselage section according to the invention, wherein the production unit comprises a first path comprising a first positioning station for the panels and a first joining station for the panels, a gear comprising a lower mounting support, according to the invention, being displaced along the first path from the first positioning station for the panels to the first joining station for the panels; a second path comprising a second positioning station for the panels and a second joining station for the panels and a gear comprising an upper mounting support, according to the invention, being displaced along the second path from the second positioning station for the panels to the second joining station for the panels, a transfer station allowing the lower or upper mounting supports to switch from one path to the other so as to reach a positioning and joining station for the first and second parts of the section.

According to another feature, i) the positioning and joining station for the lower and upper parts of the section is positioned on the first path; ii) the first path is configured to allow each lower mounting support to be displaced under the first path and each upper mounting support to be displaced over at least a part of the first path and iii) the second path is configured to allow each upper mounting support to be displaced over the second path.

According to another feature, i) the first path describes a closed loop to allow all the lower mounting supports to return, after the assembly of a fuselage section, to the first positioning station for the panels; and ii) the second path describes a closed loop to allow all the upper mounting supports to return, after the assembly of a fuselage section, to the second positioning station for the panels.

According to another feature, the transfer station comprises first and second downstream turntables provided on the first and second paths, a transfer path linking the first and second downstream turntables and at least one elevator for at least one of the first and second downstream turntables.

According to another feature, the transfer path is at the same height as the first path and the transfer station comprises a first elevator for the first downstream turntable of the first path and a second elevator for the second downstream turntable of the second path.

BRIEF DESCRIPTION OF THE DRAWINGS

Other features and advantages will emerge from the following description of the invention, a description given purely by way of example, with respect to the attached drawings in which:

FIG. 1 is a perspective view of a fuselage section which illustrates an embodiment of the invention, FIG. 2 is a cross section of two fuselage sections which have different cross sections, FIG. 3A is a cross section of the panels of a lower part of a fuselage section which illustrates an embodiment of the invention, FIG. 3B is a cross section of the panels of an upper part of a fuselage section which illustrates an embodiment of the invention, FIG. 4 is a perspective view of a panel of a fuselage section equipped with a framework which illustrates an embodiment of the invention, FIG. 15 is a plan view of the fuselage section production unit visible in FIG. 14, FIG. 16A is a front view of the station for checking the positioning of the panels linked to a lower mounting support which illustrates an embodiment of the invention, FIG. 16B is a front view of a station for checking the positioning of the panels linked to an upper mounting support which illustrates an embodiment of the invention, FIG. 17A is a front view of a joining station for the panels of a lower part of a fuselage section, FIG. 17B is a front view of a joining station for the panels of an upper part of a fuselage section.

DETAILED DESCRIPTION OF THE PREFERRED EMBODIMENTS

Figure 5:
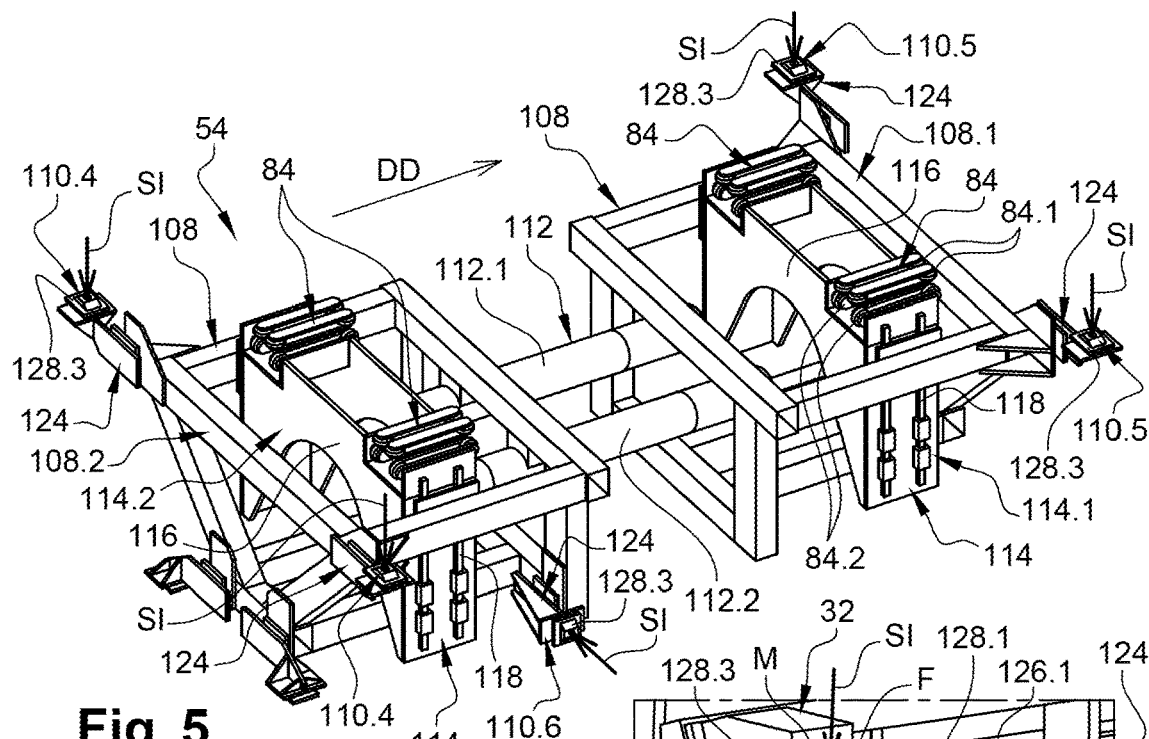
FIG. 5 is a perspective view from above of a lower mounting support which illustrates an embodiment of the invention.

In FIG. 1, a fuselage section 10 is represented which has an approximately cylindrical form and an axis A10 (parallel to the longitudinal direction). The fuselage section 10 extends between the first and second transverse peripheral edges 10a, 10b arranged in transverse planes. The fuselage section 10 comprises a structure 12 which comprises longitudinal stiffening pieces 14.1 (called stringers) and transverse stiffening pieces 14.2 (called fuselage frames) and a skin 16 added onto the structure 12.

As illustrated in FIG. 2, according to a first embodiment, the fuselage section 10 has an approximately circular cross section S1 or, according to a second embodiment, an approximately ovoid cross section S2.

According to one configuration, the fuselage section 10 comprises six panels 18.1 to 18.6 distributed over its circumference, a lower panel 18.1, right and left lower lateral panels 18.2, 18.3, right and left upper lateral panels 18.4, 18.5 and an upper panel 18.6.

As illustrated in FIG. 4, each panel 18.1 to 18.6 comprises a wall 20 forming a part of the skin 16 of the section of the fuselage and a structure 12, added onto one of the faces, called internal face 22, of the wall 20, comprising longitudinal stiffening pieces 14.1 and portions of transverse stiffening pieces 14.2. Each panel 18.1 to 18.6 comprises two parallel longitudinal edges 24.1, 24.2 and two transverse edges 26.1, 26.2 which constitute portions of the transverse peripheral edges 10a, 10b.

Each panel 18.1 to 18.6 is produced at a first production unit which can be remote from a second production unit where the panels 18.1 to 18.6 are assembled so as to obtain fuselage sections 10.

As illustrated in FIG. 4, each panel 18.1 to 18.6 comprises a framework 28, secured to the internal face 22, linked to the panel by at least one removable link, for example using pins or screws screwed into tappings provided on the structure 12 of the panel 18.1 to 18.6. According to one embodiment, this framework 28 comprises a fuselage frame 28.1 and longitudinal stiffening pieces 28.2, transverse stiffening pieces 28.3 and oblique stiffening pieces 28.4. This framework 28 is configured to limit the deformations of the panel 18.1 to 18.6, in particular during transportation. Other functions of the framework 28 will be detailed later.

Figure 8:
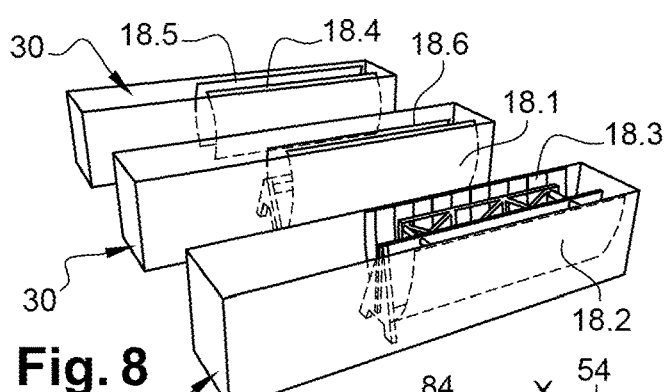
FIG. 8 is a perspective view of fuselage section panel storage containers which illustrates an embodiment.
Figure 9:
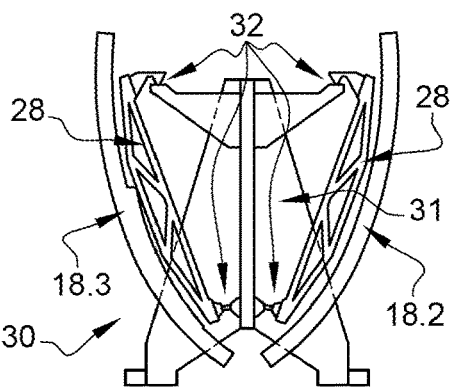
FIG. 9 is a cross section of a storage support supporting two panels which illustrates an embodiment of the invention.
Figure 10:
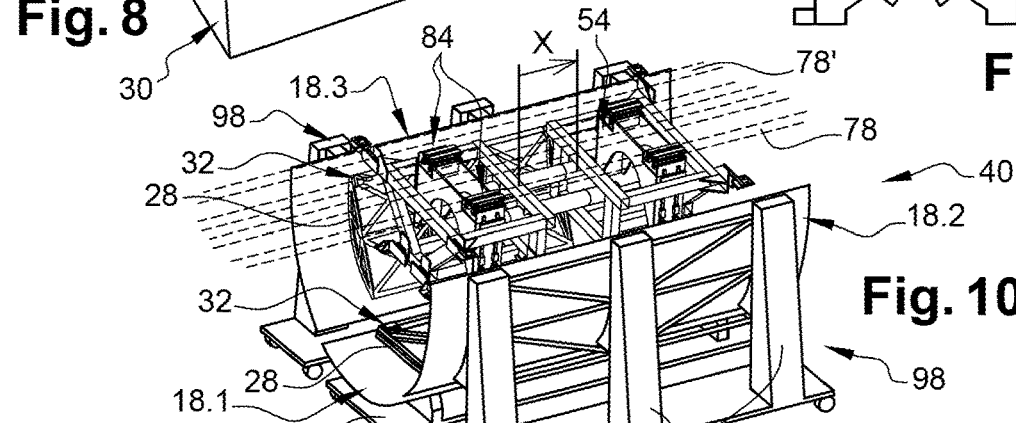
FIG. 10 is a perspective view of the lower mounting support visible in FIG. 5 and of panel transport trolleys.

According to a conditioning mode visible in FIGS. 8 and 9, the panels 18.1 to 18.6 are stored in containers 30 to ensure, in particular, the transportation of the panels 18.1 to 18.6 from one production unit to the other.

According to a configuration visible in FIG. 9, each container 30 contains two panels 18.2 to 18.3 suspended on a storage support 31. To this end, the framework 28 comprises at least three panel interfaces 32 for suspending each panel 18.1 to 18.6 on a storage support. These panel interfaces 32 will be detailed later. Obviously, the invention is not limited to this embodiment for the storage of the panels 18.1 to 18.6.

According to a feature of the invention, as illustrated in FIGS. 3A and 3B, the fuselage section 10 is obtained by assembling a lower part of the section 34, obtained by previously assembling at least two panels, and an upper part 36 obtained by previously assembling at least two panels. According to a configuration illustrated by FIGS. 3A and 3B, the lower part 34 (visible in FIG. 3A) comprises a lower panel 18.1 and right and left lower lateral panels 18.2, 18.3, the upper part of the section 36 (visible in FIG. 3B) comprising an upper panel 18.6 and right and left upper lateral panels 18.4, 18.5.

The method for assembling the fuselage comprises:

for each lower or upper part of the section 34, 36, a step of positioning of the panels 18.1 to 18.6 and a step of joining of the panels 18.1 to 18.6 so as to obtain a lower or upper part of the section 34, 36 each composed of three panels, a step of positioning of the lower and upper parts of the section 34, 36 and a step of joining of the lower and upper parts of the section 34, 36 so as to obtain the fuselage section 10, steps of mold-stripping and of discharging of the fuselage section 10 thus produced.

The assembly method can comprise a step of checking of the positioning of the panels 18.1 to 18.6 prior to the step of joining of the panels so as to obtain a lower or upper part of the section 34, 36.

According to one procedure, each step of joining of the panels 18.1 to 18.6 comprises a step of joining of the walls 20 of the panels 18.1 to 18.6 and a step of joining of the structures 12 of the panels 18.1 to 18.6 and more particularly of the portions of the transverse stiffening pieces 14.2 of the panels 18.1 to 18.6 to one another. The step of joining of the lower and upper parts of the section 34, 36 comprises a step of joining of the walls 20 of the lower and upper parts of the section 34, 36 and a step of joining of the structures 12 and more particularly of the portions of the transverse stiffening pieces 14.2 of the lower and upper parts of the section 34, 36.

Figure 14:
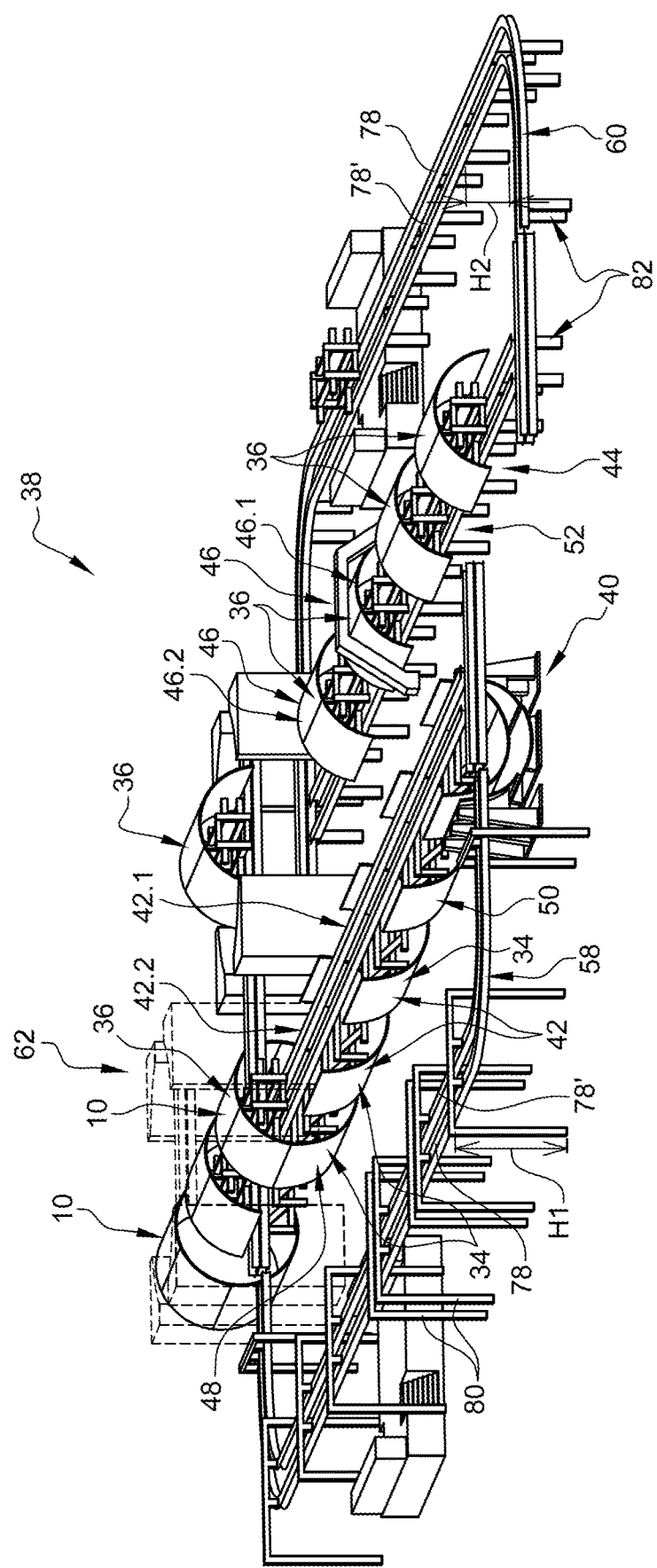
FIG. 14 is a perspective view of a fuselage section production unit which illustrates an embodiment of the invention.
Figure 15:
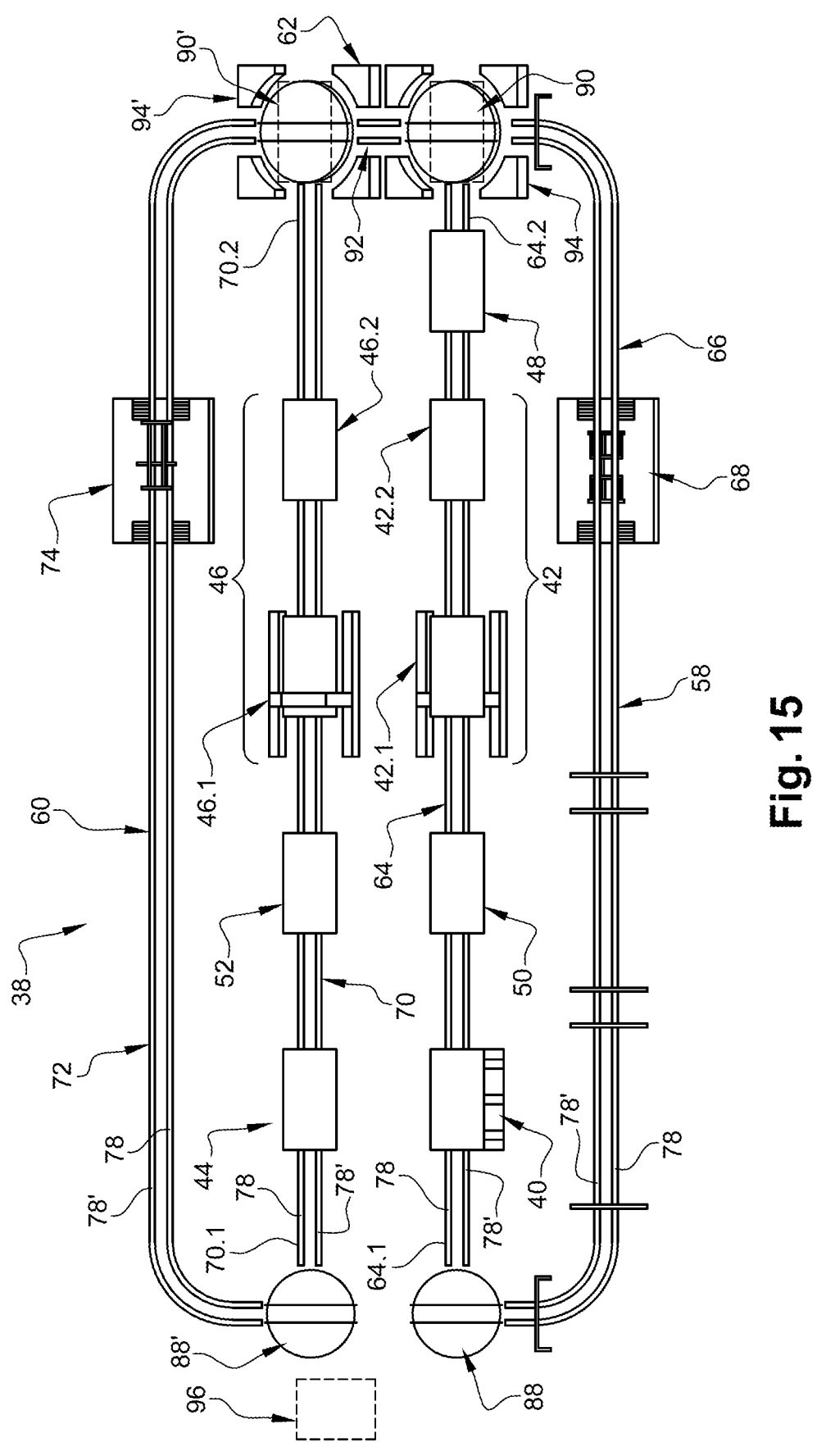

According to an embodiment visible in FIGS. 14 and 15, a fuselage section production unit 38 making it possible to implement the assembly method comprises:
for the lower part of section 34:
a first positioning station 40 for the panels 18.1 to 18.3,
a first joining station 42 for the panels 18.1 to 18.3,
for the upper part of section 36:
a second positioning station 44 for the panels 18.4 to 18.6,
a second joining station 46 for the panels 18.4 to 18.6,
for the lower and upper parts of the section 34, 36:
a positioning and joining station 48.

According to one embodiment, the production unit 38 comprises, for the lower part of the section 34, a first positioning checking station 50, inserted between the first positioning station 40 and the first joining station 42 and/or, for the upper part of the section 36, a second positioning checking station 52 inserted between the second positioning station 44 and the second joining station 46. The first joining station 42 can be subdivided into a first joining station 42.1 for the walls 20 of the panels 18.1 to 18.3 and a first joining station 42.2 for the structures 12 of the panels 18.1 to 18.3. The second joining station 46 can be subdivided into a second joining station 46.1 for the walls 20 of the panels 18.4 to 18.6 and a second joining station 46.2 for the structures 12 of the panels 18.4 to 18.6. Similarly, the positioning and joining station 48 for the lower and upper parts of the section 34, 36 could be subdivided into several stations, for example one dedicated to the positioning, another dedicated to the joining of the walls and finally another dedicated to the joining of the structures.

The grouping together of several operations on one and the same station or the distribution thereof over several stations is determined so as to obtain substantially uniform intervention times on each of the stations.

According to another feature, the production unit 38 comprises at least one lower mounting support 54 configured to support the lower panel 18.1 and the right and left lower lateral panels 18.2, 18.3 then displace them from one station to the other, and at least one upper mounting support 56 configured to support the upper panel 18.6 and the right and left upper lateral panels 18.4, 18.5 and displace them from one station to the other.

According to another feature, the production unit 38 comprises at least two paths, a first path 58 configured to allow the lower mounting support 54 to be displaced from the first positioning station 40 for the panels 18.1 to 18.3 to the first joining station 42 for the panels 18.1 to 18.3 and a second path 60 configured to allow the upper mounting support 56 to be displaced from the second positioning station 44 for the panels 18.4 to 18.6 to the second joining station 46 for the panels 18.4 to 18.6, the positioning and joining station 48 for the lower and upper parts of the section 34, 36 being positioned on the first path 58 or on the second path 60.

According to one embodiment, the first path 58 describes a closed loop to allow all the lower mounting supports 54 to return, after the assembly of a fuselage section 10, to the first positioning station 40 for the panels 18.1 to 18.3. In parallel, the second path 60 describes a closed loop to allow all the upper mounting supports 56 to return, after the assembly of a fuselage section 10, to the second positioning station 44 for the panels 18.1 to 18.3. The production unit 38 comprises a transfer station 62 allowing the lower 54 or upper 56 mounting supports to switch from one path to the other so as to reach the positioning and joining station 48 for the first and second parts of the section 34, 36. The first or second path 58, 60 comprising the positioning and joining station 48 has a mobile section configured to occupy a continuous position in which it ensures the continuity of the path so as to obtain a closed loop and a staggered position in which it opens the loop to allow the discharging of the fuselage section 10 produced.

According to one configuration, the transfer station 62 allows each of the upper mounting supports 56 to be transferred, after the second joining station 46, to the positioning and joining station 48 positioned on the first path 58 after the first joining station 42.

According to one embodiment, the first path 58 comprises a first mounting portion 64, which extends from a first upstream end 64.1 to a first downstream end 64.2, where the first positioning station 40, the possible positioning checking station 50, the joining station or stations 42 and the positioning and joining station 48 are positioned; and a first return portion 66, comprising at least one first reconditioning station 68, linking the first downstream and upstream ends 64.1, 64.2 of the first mounting portion 64. The second path 60 comprises a second mounting portion 70, which extends from a second upstream end 70.1 to a second downstream end 70.2, where the second positioning station 44, the possible second positioning checking station 52 and the joining station or stations 46 are positioned; and a second return portion 72, comprising at least one second reconditioning station 74, linking the second downstream and upstream ends 70.1, 70.2 of the second mounting portion 70. The transfer station 62 is configured to ensure the transfer of each upper mounting support 56 between the first and second downstream ends 64.2 and 70.2.

The first and second conditioning stations 68, 74 are provided to remove the frameworks 28 and/or configure the lower and upper mounting supports 54, 56 according to the fuselage to be produced.

The first path 58 is configured to allow each lower mounting support 54 to be displaced under the first path 58, along the latter, stopping at each station; and each upper mounting support 56 to be displaced over the first path 58, at least over a part thereof, in particular that which extends between the first downstream end 64.2 and the positioning and joining station 48.

The second path 60 is configured to allow each upper mounting support 56 to be displaced over the second path 60, along the latter, stopping at each station.

Inasmuch as the lower mounting supports 54 are positioned under the first path 58 whereas the upper mounting supports 56 are positioned above the second path 60, the first path 58 is positioned at a height H1 greater than the height H2 of the second path 60. The height H1 of the first path 58 is determined so that the panels 18.1 to 18.3 of the fuselage sections having the greatest cross sections can be secured to a lower mounting support 54 travelling under the first path 58.

According to one embodiment, each path 58, 60 comprises at least one rail 78, preferably two rails 78, 78' parallel to one another. For the first and second paths 58, 60, the two rails 78, 78' are configured in the same way with the same section and the same spacing. The rails 78, 78' of the first path 58 are held at height by virtue of gantries 80 to allow the passage of the lower mounting supports 54 under the first path 58 and the rails 78, 78' of the second path 60 are held at height by uprights 82 to allow the passage of the upper mounting supports 54 on the second path 60.

Each lower mounting support 54 comprises at least one first guiding system 84 allowing it to be displaced along the rail or rails 78, 78', preferably at least two of them, one for each rail 78, 78'. According to one configuration, at least one of the first guiding systems 84 is motorized to allow each lower mounting support 54 to be displaced along the rails 78, 78' autonomously.

Each upper mounting support 56 comprises at least one second guiding system 86 allowing it to be displaced along the rail or rails 78, 78', preferably at least two of them, one for each rail 78, 78'. According to one configuration, at least one of these second guiding systems 86 is motorized to allow each upper mounting support 56 to be displaced along the rails 78, 78' autonomously.

Figure 12:
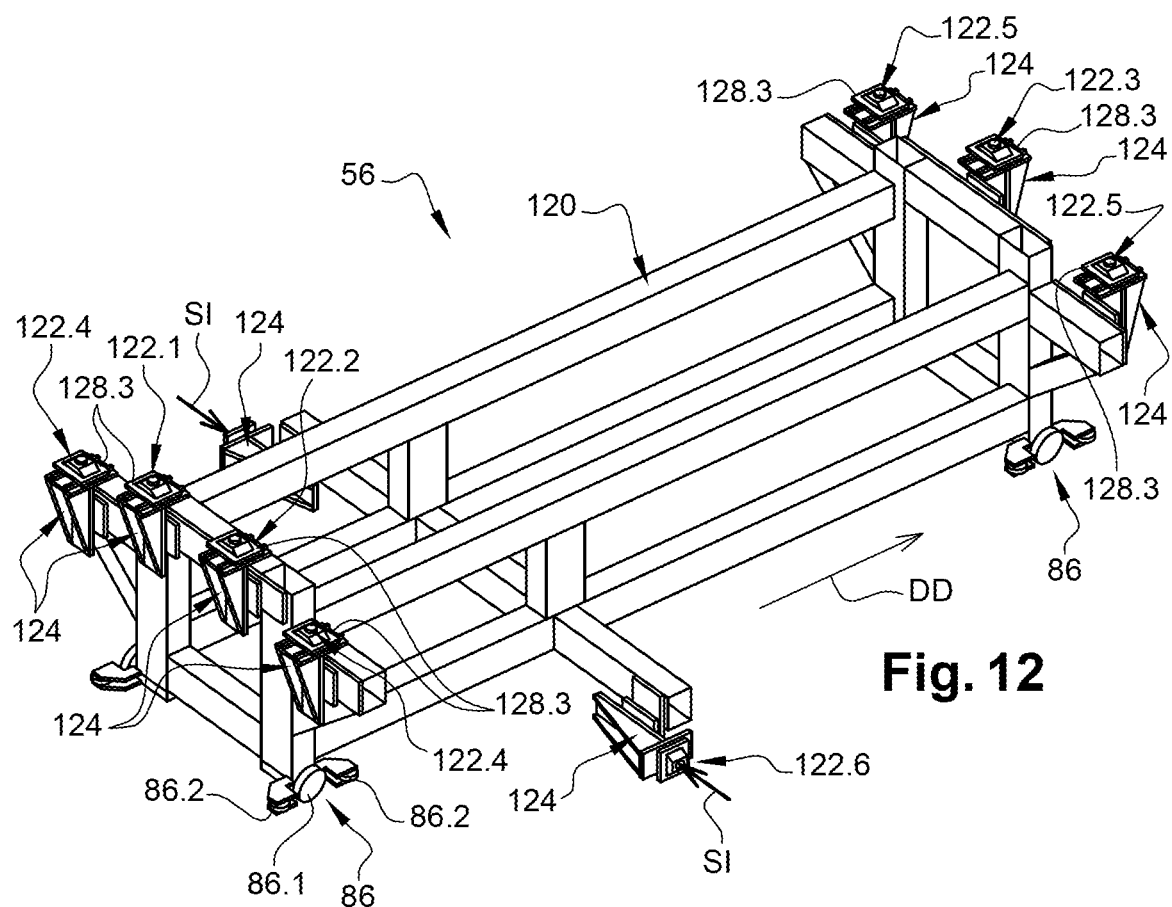
FIG. 12 is a perspective view from above of an upper mounting support which illustrates an embodiment of the invention.
Figure 13:
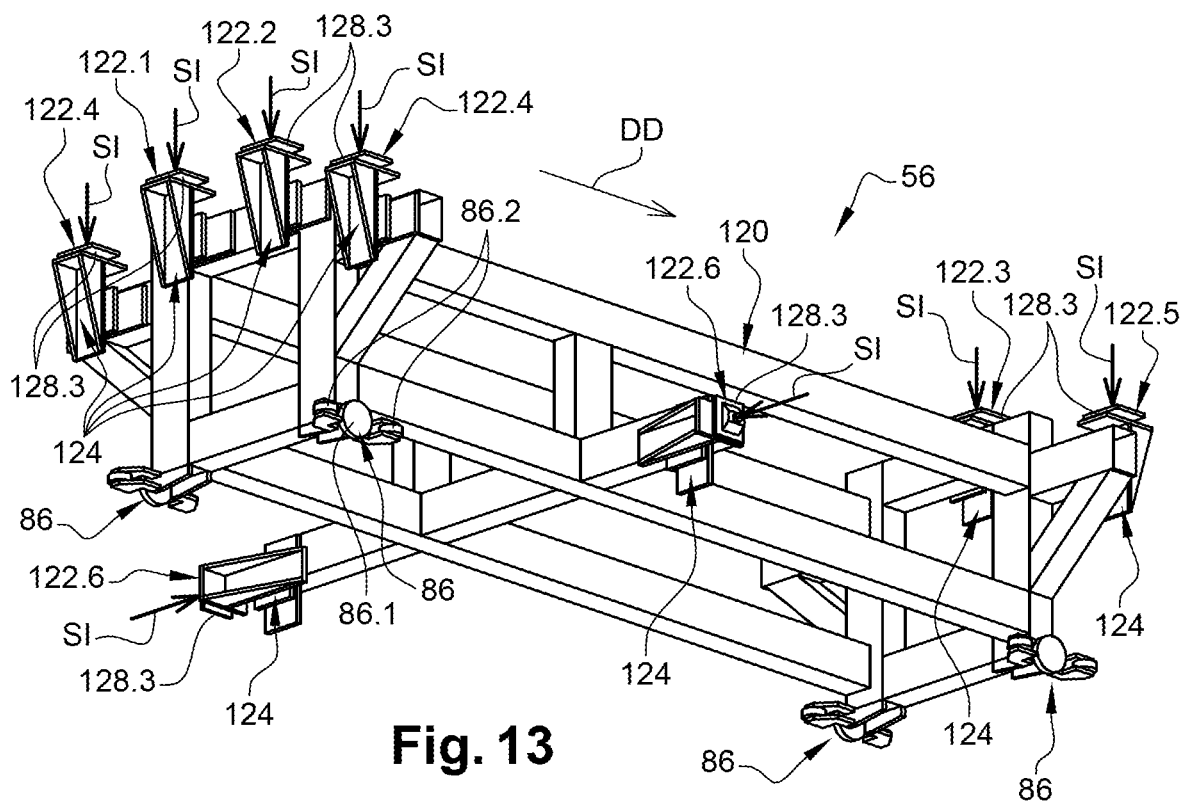
FIG. 13 is a perspective view from below of the upper mounting support visible in FIG. 12.

According to one embodiment, each rail 78, 78' has an I section and has a vertical web and top and bottom horizontal flanges provided at the ends of the vertical web. As illustrated in FIG. 5, each first guiding system 84 comprises two first sets of rollers 84.1 having vertical pivoting axes, the first sets being arranged on either side of the vertical web of a rail 78, 78' and configured to roll on each face of the vertical web of a rail 78, 78'. Each first guiding system 84 also comprises two second sets of rollers 84.2 having horizontal pivoting axes, the second sets being arranged on either side of the vertical web of a rail 78, 78' and configured to roll on the bottom flange of a rail 78, 78'. As illustrated in FIGS. 12 and 13, each second guiding system 86 comprises a first roller 86.1 which has a horizontal pivoting axis and which is configured to roll on a bottom flange of a rail 78, 78'; and two second rollers 86.2, arranged on either side of the first roller 86.1, which have vertical pivoting axes and which are configured to roll against the vertical web of a rail 78, 78'.

According to a configuration visible in FIG. 15, the first and second return portions 66, 72 of the first and second paths 58, 60 each describe a U. At each upstream or downstream end 64.1, 64.2, 70.1, 70.2, the return portion 66, 72 and the mounting portion 64, 70 form a 90° angle. Each of the first and second paths 58, 60 comprises, at its upstream end 64.1, 70.1, a first or second upstream turntable 88, 88' configured to allow each lower or upper mounting support 54, 56 to switch, for each path 58, 60, from the return portion 66, 72 to the mounting portion 64, 70. Each of the first and second paths 58, 60 comprises, at its downstream end 64.2, 70.2, a first or second downstream turntable 90, 90' configured to allow each lower or upper mounting support 54, 56 to switch, for each path 58, 60, from the mounting portion 64, 70 to the return portion 66, 72.

According to one embodiment, each turntable 88, 88', 90, 90' comprises a platform, in disk form, that is mobile about a vertical pivoting axis, which has two rails configured to be aligned alternately either with the rails 78, 78' of the return portion 66, 72 or with the rails 78, 78' of the mounting portion 64, 70.

According to an embodiment visible in FIGS. 15, 18A to 18E, the transfer station 62 also comprises first and second downstream turntables 90, 90' provided at the first and second downstream ends 64.2, 70.2 of the first and second paths 58, 60, a transfer path 92 linking the first and second downstream turntables 90, 90' and at least one elevator 94 for at least one of the first and second downstream turntables 90, 90' to compensate for the difference in height between the first and second paths 58, 60 and to allow the discharging of the fuselage section 10 produced. According to one configuration, the transfer path 92 is at the same height as the first path 58 and the transfer station 62 comprises a first elevator 94 for the first downstream turntable 90 of the first path 58 in order to allow the discharging of the fuselage section produced; and a second elevator 94' for the second downstream turntable 90' of the second path 60 to compensate for the difference in height between the first and second paths 58, 60.

Obviously, the invention is not limited to these embodiments for the paths 58, 60, for the guiding systems 84, 86, for the transfer station 62. Whatever the embodiment, at least one of the lower or upper mounting supports 54, 56 is displaced so that the upper mounting support 56 is positioned above the lower mounting support 54 at the positioning and joining station 48.

The production unit 38 also comprises a storage zone 96 where the panels 18.1 to 18.6 are stored before being assembled. According to one configuration, the storage zone 96 is positioned in the extension of the first and second mounting portions 64, 70, in proximity to the upstream turntables 88, 88'. The production unit 38 comprises transport trolleys 98 for conveying each of the panels 18.1 to 18.6 from the storage zone 96 to one of the first and second positioning stations 40, 44.

According to an embodiment visible in FIGS. 10, 11A to 11C, each transport trolley 98 comprises a rolling base 100 and at least two vertically telescopic uprights 102 to which a panel 18.2 to 18.5 is linked, configured to make it possible to displace the panel 18.2 to 18.5 vertically in order to fix it to a lower or upper mounting support 54, 56. Some transport trolleys 98 are configured to transport right lateral panels and others to transport the left lateral panels.

Each transport trolley 98' intended for the upper and lower panels 18.1, 18.6 comprises a rolling base 104 configured to receive a panel 18.1, 18.6.

Figure 6:
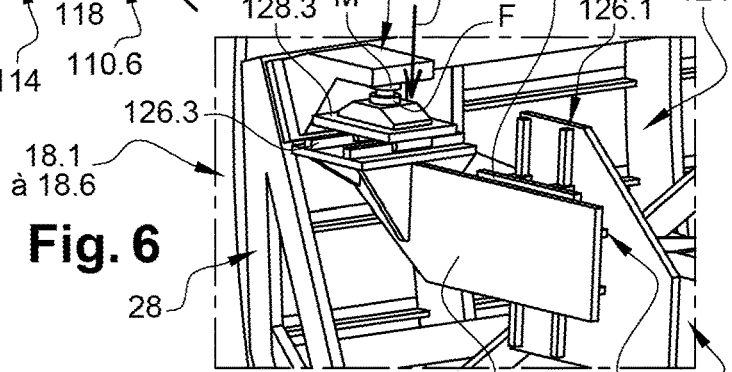
FIG. 6 is a perspective view of the interfaces of a panel and of the lower mounting support visible in FIG. 5.
Figure 7:
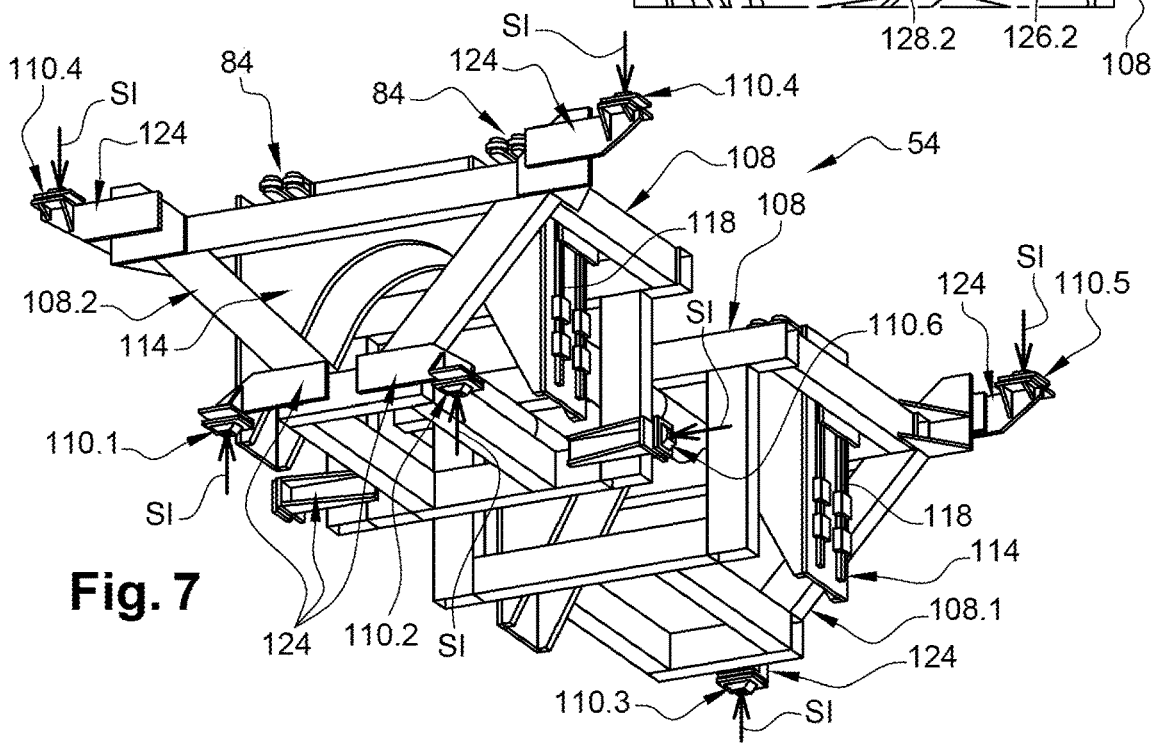
FIG. 7 is a perspective view from below of the lower mounting support visible in FIG. 5.

According to an embodiment visible in FIGS. 5 to 7, the lower mounting support 54 comprises a frame 108, mobile in a direction of displacement DD, having interfaces 110.1 to 110.6 configured to cooperate with panel interfaces 32 in order to secure the panels 18.1 to 18.3 according to a given position to the lower mounting support 54.

According to one configuration, the frame 108 is telescopic and comprises a front frame 108.1, a rear frame 108.2 and a telescopic link 112, linking the front and rear frames 108.1 and 108.2, configured to occupy a mobile state in which the telescopic link 112 makes it possible to increase or reduce the separation of the front and rear frames 108.1, 108.2 according to the direction of displacement DD in order to set their separation and a blocked state in which the telescopic link 112 holds the front and rear frames 108.1 and 108.2 in a given position. This configuration makes it possible to be able to use the same lower mounting support 54 for panels 18.1 to 18.3 of different lengths. According to one embodiment, the telescopic link 112 comprises at least two telescopic tubes 112.1, 112.2.

According to one configuration, the lower mounting support 54 comprises at least one vertical displacement system 114 configured to displace the frame 108 vertically, in particular a front vertical displacement system 114.1 for the front frame 108.1, and a rear vertical displacement system 114.2 for the rear frame 108.2. According to one embodiment, each vertical displacement system 114, 114.1, 114.2 comprises a body 116, in the form of an inverted U, to which are linked two guiding systems 84 of the lower mounting support 54 with respect to the first path 58; and at least one vertical runner 118, preferably two runners 118 secured to the branches of the U, configured to link the body 116 to the frame 108, in particular to the front or rear frame 108.1, 108.2. This configuration makes it possible in particular to be able to secure the lower panel 18.1 to the lower mounting support 54, as illustrated in FIGS. 11A to 11D. The presence of at least one vertical displacement system 114 also makes it possible to be able to set the relative position of the lower and upper mounting supports 54, 56 at the positioning and joining station 48 according to the cross section of the fuselage section 10 to be produced, which improves the multipurpose nature of the lower and upper mounting supports 54, 56.

According to an embodiment visible in FIGS. 12 and 13, the upper mounting support 56 comprises a frame 120, mobile in a direction of displacement DD, having support interfaces 122.1 to 122.6 configured to cooperate with panel interfaces 32 in order to secure the panels 18.4 to 18.6 according to a given position to the upper mounting support 56. As previously, the frame 120 could be telescopic and comprise a front frame and a rear frame linked by a telescopic link, adjustable in the direction of displacement DD, configured to alternately occupy mobile and blocked states.

If one of the lower and upper mounting supports 54, 56 is not telescopic, it can support panels 18.1 to 18.6 of different lengths by adjusting the position of the panel interfaces 32 and/or of the support interfaces 110.1 to 110.6, 122.1 to 122.6.

Whatever the embodiment, at least one of the lower and upper mounting supports 54, 56 comprises a vertical displacement system 114 for its frame 108, 120 to be able to set the relative position of the lower and upper mounting supports 54, 56 at the positioning and joining station 48 according to the cross section of the fuselage section 10 to be produced.

According to a feature of the invention, each lower or upper mounting support 54, 56 comprises, for at least some support interfaces 110.1 to 110.6, 122.1 to 122.6, a link 124 that can be adjusted according to three orthogonal directions Tx, Ty, Tz, linking the interfaces 110.1 to 110.6, 122.1 to 122.6 to the frames 108, 120. According to one configuration, all the support interfaces 110.1 to 110.6, 122.1 to 122.6 are each linked to the frames 108, 120 by a link 124 that can be adjusted according to three orthogonal directions Tx, Ty, Tz. This configuration makes it possible to adjust the position of each panel 18.1 to 18.6. According to an embodiment illustrated by FIG. 6, each link 124 that can be adjusted according to three orthogonal directions Tx, Ty, Tz comprises a first runner 126.1, that is mobile in a vertical direction Tz, linking the frame 108, 120 to a first support 128.1, a second runner 126.2, that is mobile in a direction Ty that is horizontal and at right angles to the direction of displacement DD, linking the first support 128.1 to a second support 128.2 and a third runner 126.3, that is mobile in a direction Tx that is horizontal and parallel to the direction of displacement DD, linking the second support 128.2 to a third support 128.3. For each of the adjustable links 124, the movements of the first, second and third supports 128.1 to 128.3 can be motorized and controlled by a controller.

By virtue of this arrangement, each lower or upper mounting support 54, 56 can be adapted to different forms and dimensions of panels 18.1 to 18.6 according to the cross section of the fuselage section 10 to be produced, which improves the multipurpose nature of the lower and upper mounting supports 54, 56.

For each panel 18.1 to 18.6, each lower or upper mounting support 54, 56 comprises at least three support interfaces 110.1 to 110.6, 122.1 to 122.6. According to one configuration, each lower or upper mounting support 54, 56 comprises three support interfaces 110.1 to 110.6, 122.1 to 122.6 for each panel 18.1 to 18.6 so as to obtain an isostatic link between each panel 18.1 to 18.6 and each lower or upper mounting support 54, 56.

When the lower or upper mounting support 54, 56 comprises a front frame 108.1 and a rear frame 108.2, the lower or upper mounting support 54, 56 comprises, for each panel 18.1 to 18.6, at least one support interface 110.1 to 110.6, 122.1 to 122.6 secured to the front frame 108.1 and at least one support interface 110.1 to 110.6, 122.1 to 122.6 secured to the rear frame 108.2.

The lower mounting support 54 comprises:

for the lower panel 18.1, three support interfaces 110.1, 110.2, 110.3 each linked to the frame 108 by an adjustable link 124 of which the third support 128.3 has an approximately horizontal plate, for each of the right and left lower lateral panels 18.2, 18.3, two upper support interfaces 110.4, 110.5 positioned in the upper part of the frame 108, substantially at the same height, at each of the ends of the frame 108, each linked to the frame 108 by an adjustable link 124 of which the third support 128.3 has an approximately horizontal plate and a lower support interface 110.6, positioned in the lower part of the frame 108, linked to the frame 108 by an adjustable link 124 of which the third support 128.3 has a substantially vertical plate.

The upper mounting support 56 comprises:

for the upper panel 18.6, three support interfaces 122.1, 122.2, 122.3 each linked to the frame 120 by an adjustable link 124 of which the third support 128.3 has an approximately horizontal plate, for each of the right and left upper lateral panels 18.4, 18.5, two upper support interfaces 122.4, 122.5 positioned in the upper part of the frame 120, substantially at the same height, at each of the ends of the frame 120, each linked to the frame 120 by an adjustable link 124 of which the third support 128.3 has an approximately horizontal plate; and a lower support interface 122.6, positioned in the lower part of the frame 120, linked to the frame 120 by an adjustable link 124 of which the third support 128.3 has a substantially vertical plate.

According to a feature of the invention, each support interface 110.1 to 110.6, 122.1 to 122.6 is configured to cooperate with a panel interface 32 in a centered position so that the panel interface 32 is immobilized in a known position with respect to the support interface 110.1 to 110.6, 122.1 to 122.6. According to an embodiment visible in FIG. 6, each support interface 110.1 to 110.6, 122.1 to 122.6 comprises a male part M configured to be introduced into a female part F secured to a panel interface 32. According to another embodiment, each support interface 110.1 to 110.6, 122.1 to 122.6 comprises a female part F configured to receive a male part M secured to a panel interface 32. For these two embodiments, each support and panel interface pair comprises a male part M configured to be introduced in a direction of introduction SI into a female part F. When the male part M is in the centered position, the male part M is immobilized with respect to the female part F in a plane at right angles to the direction of introduction SI. In the centered position, the male part M is in contact with an abutment of the female part F and can no longer be translated in the direction of introduction SI, it can be translated only in a direction opposite to the direction of introduction SI.

When, for one and the same panel 18.1 to 18.6, all the support interfaces 110.1 to 110.6, 122.1 to 122.6 and the panel interfaces 32 are in the centered position, the position of the panel 18.1 to 18.6 with respect to the lower or upper mounting support 54, 56 is perfectly known. It is possible, by adjusting the adjustable links 124, to adjust the position of each panel 18.1 to 18.6 with respect to the lower and upper mounting supports 54, 56 and thus the position of the panels 18.1 to 18.6 with respect to one another.

For at least some support and panel interface pairs, the support interface 110.1 to 110.6, 122.1 to 122.6 and/or the panel interface 32 comprises a system for immobilization in the centered position. Such an immobilization system is necessary when the direction of introduction SI is vertical and oriented upward or when the direction of introduction SI is horizontal. It is not necessary when the direction of introduction SI is vertical and oriented downward. According to one embodiment, the immobilization system is a knuckle joint clamp.

According to one configuration, the three support interfaces 110.1 to 110.3 intended for the lower panel 18.1 have a direction of introduction SI that is vertical and oriented upward. The upper support interfaces 110.4, 110.5, 122.4, 122.5 positioned in the upper part of the frames 108, 120, intended for right and left upper and lower lateral panels 18.2 to 18.5, have a direction of introduction SI that is vertical oriented downward. The lower support interfaces 110.6, 122.6, intended for the right and left upper and lower lateral panels 18.2 to 18.5, have a direction of introduction SI that is horizontal oriented toward the frame 108, 120. The three support interfaces 122.1 to 122.3, intended for the upper panel 18.6, have a direction of introduction SI that is vertical and oriented downward.

Obviously, the invention is not limited to the embodiment previously described of the gear composed of the lower and upper mounting supports 54, 56 and the frameworks 28. Other solutions could be envisaged for the link between each panel 18.1 to 18.6 and its lower or upper mounting support 54, 56. This link must be configured to make it possible to adjust the positioning (position and orientation) of each panel 18.1 to 18.6 according to a desired configuration and to immobilize each panel 18.1 to 18.6 with respect to the lower and upper mounting supports 54, 56 according to the desired configuration.

According to one embodiment, each lower or upper mounting support 54, 56 is equipped with stress sensors making it possible to determine at least one stress exerted by each panel 18.1 to 18.6 on the lower or upper mounting support 54, 56. For each panel 18.1 to 18.6, each lower or upper mounting support 54, 56 comprises several stress sensors making it possible to determine at several points the stresses exerted by the panel 18.1 to 18.6 on the lower or upper mounting support 54, 56. These stress sensors can be used to adjust the position of each panel 18.1 to 18.6 on each of the lower or upper mounting supports 54, 56.

According to an embodiment visible in FIGS. 16A and 16B, each first or second positioning checking station 50, 52 comprises at least one range finder 130 and each panel comprises several targets 132, each range finder 130 and each target 132 being configured to measure the distance separating the target 132 and the range finder 130. For each of the first and second positioning checking stations 50, 52, the number and the positioning of the range finders 130 are determined so as to allow the range finders 130 to determine the position of each panel 18.1 to 18.6 in a given reference frame R. The position of each lower and upper mounting support 54, 56 being known in the given reference frame R and the position of each panel 18.1 to 18.6 being also known in the given reference frame R, it is possible to determine the position of each panel 18.1 to 18.6 with respect to each lower or upper mounting support 54, 56 and to adjust it by virtue of the adjustable links 124 according to a desired position.

According to an embodiment visible in FIG. 17A, the first joining station 42.1 for the walls 20 comprises at least two welding heads 134, 134' that are mobile in the direction of displacement DD, a first welding head 134 ensuring the joining of the walls 20 of the lower panel 18.1 and of the right lower lateral panel 18.2 and a second welding head 134' ensuring the joining of the walls 20 of the lower panel 18.1 and of the left lower lateral panel 18.3.

According to an embodiment visible in FIG. 17B, the second joining station 46.1 comprises at least two welding heads 136, 136' that are mobile in the direction of displacement DD, a first welding head 136 ensuring the joining of the walls 20 of the upper panel 18.6 and of the right upper lateral panel 18.4 and a second welding head 136' ensuring the joining of the walls 20 of the upper panel 18.6 and of the left upper lateral panel 18.5.

Figure 19:
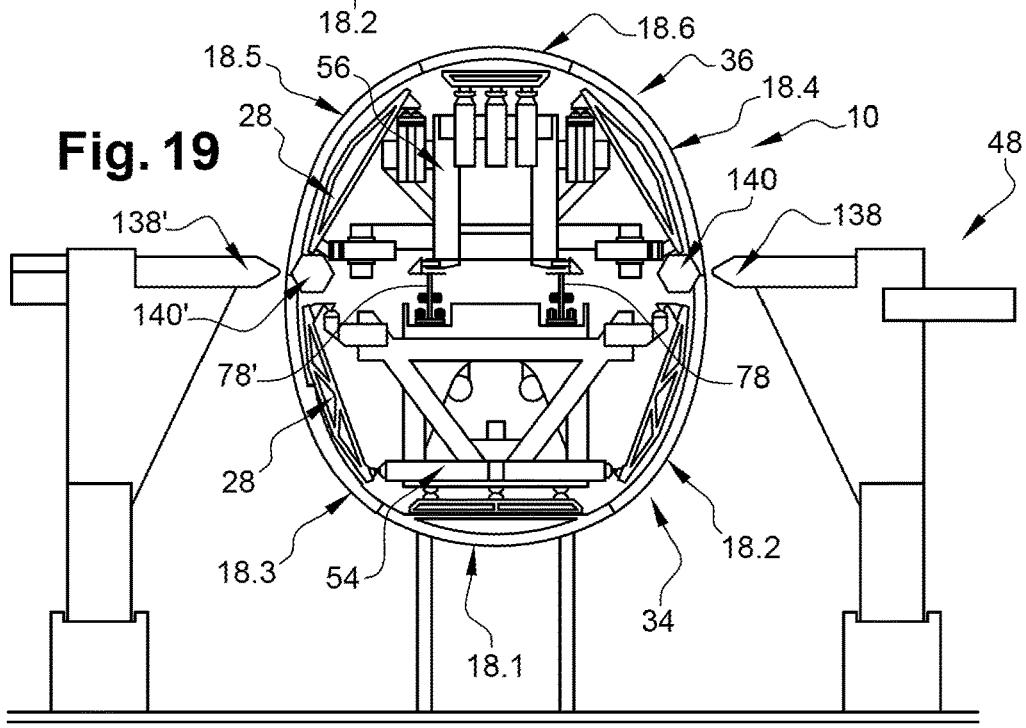
FIG. 19 is a front view of a positioning and joining station for the lower and upper parts of a fuselage section which illustrates an embodiment of the invention.

According to an embodiment visible in FIG. 19, the positioning and joining station 48 comprises at least two welding heads 138, 138' that are mobile in the direction of displacement DD, a first welding head 138 ensuring the joining of the walls 20 of the upper and lower right lateral panels 18.2, 18.4 and a second welding head 138' ensuring the joining of the walls 20 of the upper and lower left lateral panels 18.3, 18.5.

Obviously, the invention is not limited to these embodiments for the first and second joining stations 42.1, 46.1 for the walls 20 and the positioning and joining station 48. Thus, the welding heads 134, 134', 136, 136', 138, 138' could be replaced by effectors configured to fit rivets.

The first and second joining stations 42.2, 46.2 for the structures 12 and the positioning and joining station 48 each comprise at least two automated facilities 140, 140' configured to ensure the joining of the structures 12 to one another. As a variant, the step of joining of the structures 12 could be semi-automated or manual and performed, at least partly, by at least one operator.

The method for assembling a fuselage section 10 is now described.

The six panels 18.1 to 18.2 each equipped with a framework 28 are stored two by two in three containers 30 positioned in the storage zone 96. Each of the panels 18.1 to 18.6 and/or each of the frameworks 28 comprise an identifier and possibly at least one marking mentioning at least one datum relating to the panel and/or to the fuselage section to be produced.

The production unit 38 comprises at least one identifier reader linked to a control station configured to control the different elements of the production unit. For each panel 18.1 to 18.6, the reading of the identifier by the identifier reader makes it possible, automatically and autonomously, to determine the transport trolley 98, 98' to be used to transport the panel 18.1 to 18.6, the first or second positioning station 40, 44 to which the panel 18.1 to 18.6 must be routed, the lower or upper mounting support 54, 56 for which the panel 18.1 to 18.2 is intended, the lengthwise adjustment of the lower and upper mounting supports 54, 56, the positioning of the panel 18.1 to 18.6 on the lower or upper mounting support 54, 56, etc.

The transfer of each panel 18.1 to 18.6 from the container 30 to a transport trolley 98, 98' can be automated. Similarly, the displacements of each transport trolley 98, 98' from the storage zone 96 to the first or second positioning station 40, 44 can also be automated and controlled by a controller.

Figure 11A:
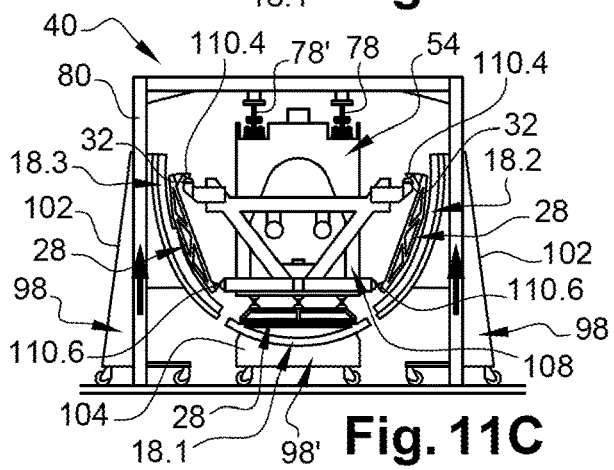
FIG. 11A is a cross section of the lower mounting support visible in FIG. 5 illustrating one step of placement of the panels on the lower mounting support.

At the first positioning station 40, each transport trolley 98, 98' is positioned with respect to the lower mounting support 54. As illustrated in FIG. 11A, the transport trolleys 98, 98' are positioned so that the lower panel 18.1 is positioned under and directly in line with the lower mounting support 54 and the right and left lower lateral panels 18.2, 18.3 are positioned on either side of the lower panel 18.1.

The support interfaces 110.4 to 110.6 are positioned in a retracted position corresponding to their position during the mold-stripping of the fuselage section 10 on completion of the assembly method.

Figure 11B:
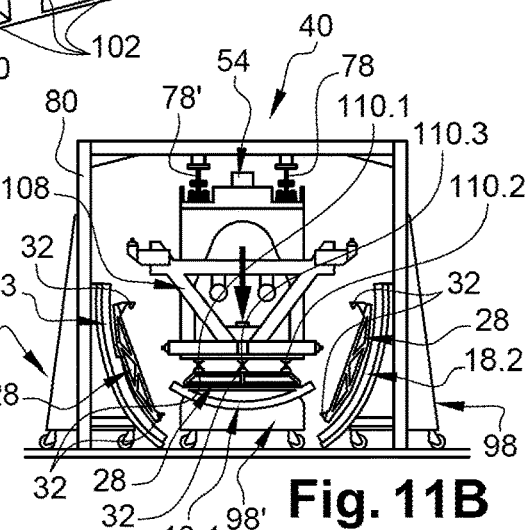
FIG. 11B is a cross section of the lower mounting support visible in FIG. 5 illustrating another step of placement of the panels on the lower mounting support.

As illustrated in FIG. 11B, the frame 108 of the lower mounting support 54 is translated downward until the support interfaces 110.1 to 110.3 are in contact with the panel interfaces 32 of the lower panel 18.1. The lower panel 18.1 is then secured to the lower mounting support 54.

Figure 11C:
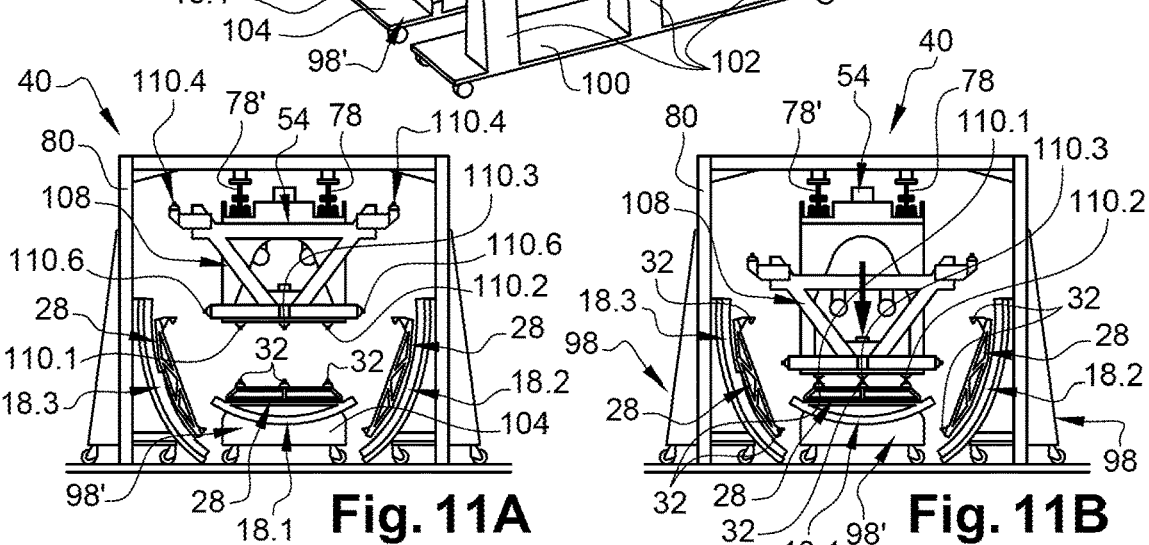
FIG. 11C is a cross section of the lower mounting support visible in FIG. 5 illustrating another step of placement of the panels on the lower mounting support.

As illustrated in FIG. 11C, the right and left lower lateral panels 18.2, 18.3 are translated upward by using the telescopic uprights 102 of the transport trolleys 98 so that the panel interfaces 32 of the right and left lower lateral panels 18.2, 18.3 are substantially at the same height as the corresponding support interfaces 110.4 to 110.6. The right and left lower lateral panels 18.2, 18.3 are then secured to the lower mounting support 54.

Figure 11D:
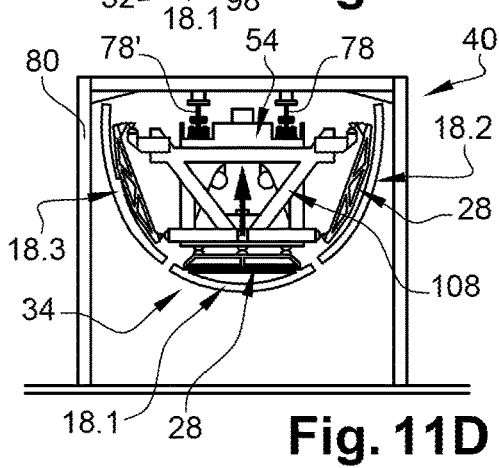
FIG. 11D is a cross section of the lower mounting support visible in FIG. 5 illustrating another step of placement of the panels on the lower mounting support.

As illustrated in FIG. 11D, the frame 108 is translated upward into a nominal position corresponding to the position of the frame throughout the assembly of the section of the fuselage 10.

As an example, FIG. 3A shows the positions of the panels 18.1 to 18.3 before their loading onto the lower mounting support 54, referenced A, B, C; and the positions of the same panels 18.1 to 18.3 secured to the lower mounting support 54, referenced A1, B1, C1.

At the second positioning station 44, each transport trolley 98, 98' is positioned with respect to the upper mounting support 56. The upper panel 18.6 is positioned on the upper mounting support 56 by any appropriate means, by making the upper support interfaces 122.1 to 122.3 cooperate with the panel interfaces 32, then the upper panel 18.6 is secured to the upper mounting support 56.

The right and left upper lateral panels 18.4, 18.5, positioned on transport trolleys 98 arranged on either side of the upper mounting support 56, are translated upward by using the telescopic uprights 102 of the transport trolleys 98 so that the panel interfaces 32 of the right and left upper lateral panels 18.4, 18.5 are substantially at the same height as the corresponding support interfaces 122.4 to 122.6. The right and left upper lateral panels 18.4, 18.5 are then secured to the upper mounting support 56.

As an example, FIG. 3B shows the positions of the panels 18.4 to 18.6 before their loading on the upper mounting support 56, referenced D, E, F; and the positions of the same panels 18.4 to 18.6 secured to the upper mounting support 56, referenced D1, E1, F1.

For each lower or upper mounting support 54, 56, the panels 18.1 to 18.6 can be pre-positioned by using the adjustable links 124.

The two lower and upper mounting supports 54, 56 are displaced to the first and second positioning checking stations 50, 52. By virtue of the values measured by the range finders 130 and/or the values of the stresses measured by the stress sensors with which the lower and upper mounting supports 54, 56 are equipped, the position of each panel 18.1 to 18.6 is corrected by virtue of the adjustable links 124.

This positioning correction operation can be automated. In this case, the values measured by the range finders 130 and/or the values of the stresses measured by the stress sensors are transmitted to a computer configured to determine correction values for each of the translational movements in the directions Tx, Ty, Tz of each adjustable link 124 and to transmit these correction values to the adjustable links 124 concerned, the adjustable links 124 being configured autonomously and automatically to perform translational movements in the directions Tx, Ty, Tz as a function of the correction values determined by the computer.

Once the panels 18.1 to 18.6 are correctly positioned with respect to the lower and upper mounting supports 54, 56, the latter are displaced to the first and second joining stations 42.1, 46.1 for the walls 20. At the first joining station 42.1, the joining of the walls 20 of the lower panel 18.1 and of the right lower lateral panel 18.2 and the joining of the walls 20 of the lower panel 18.1 and of the left lower lateral panel 18.3 are performed by welding or riveting. At the second joining station 46.1, the joining of the walls 20 of the upper panel 18.6 and of the right upper lateral panel 18.4 and the joining of the walls 20 of the upper panel 18.6 and of the left upper lateral panel 18.5 are performed by welding or riveting.

When the joinings of the walls 20 of the panels 18.1 to 18.6 have been performed, the lower and upper mounting supports 54, 56 are displaced to the first and second joining stations 42.2, 46.2 for the structures 12. At the first joining station 42.2, the joining of the structures 12 of the lower panel 18.1 and of the right lower lateral panel 18.2 and the joining of the structures 12 of the lower panel 18.1 and of the left lower lateral panel 18.3 are performed by welding or riveting. At the second joining station 46.2 for the structures 12, the joining of the structures 12 of the upper panel 18.6 and of the right upper lateral panel 18.4 and the joining of the structures 12 of the upper panel 18.6 and of the left upper lateral panel 18.5 are performed by welding or riveting.

Figure 18A:
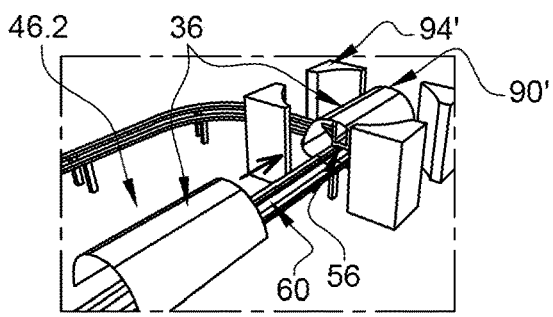
FIG. 18 is a perspective illustrating a step of positioning of an upper mounting support on a lower mounting support.
FIG. 18B is perspective view illustrating another step of positioning of an upper mounting support on a lower mounting support.
FIG. 18C is perspective view illustrating another step of positioning of an upper mounting support on a lower mounting support.
FIG. 18D is perspective view illustrating another step of positioning of an upper mounting support on a lower mounting support.
FIG. 18E is perspective view illustrating another step of positioning of an upper mounting support on a lower mounting support.
Figure 18B:
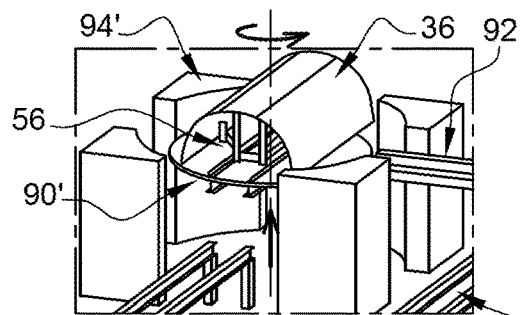
Figure 18C:
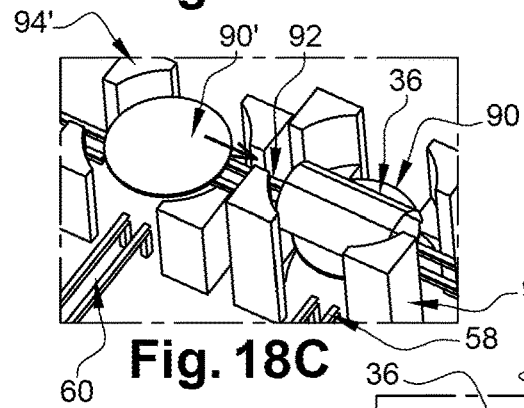
Figure 18D:
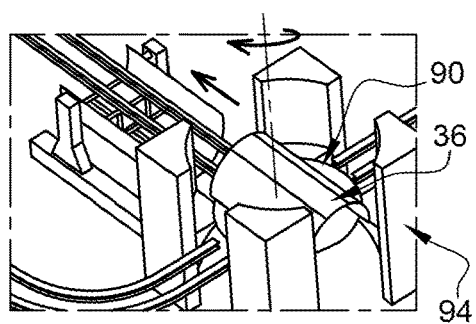

When the joinings of the structures 12 of the panels have been performed, the lower and upper mounting supports 54, 56 are displaced to the positioning and joining station 48. For that, the upper mounting support 56 is displaced to the second downstream turntable 90' of the second path 60, as illustrated in FIG. 18A. The second downstream turntable 90' is translated upward by virtue of the second elevator 94' so as to be positioned approximately at the same height as the first path 58, as illustrated in FIG. 18B. The second downstream turntable 90' is pivoted to 90° so that the upper mounting support 56 can be displaced from the second downstream turntable 90' of the second path 60 to the first downstream turntable 90 of the first path 58 by following the transfer path 92, as illustrated in FIG. 18C. The first downstream turntable 90 is pivoted so that the upper mounting support 56 can be displaced on the first path 58 in order to reach the positioning and joining station 48, as illustrated in FIG. 18D.

Figure 18E:
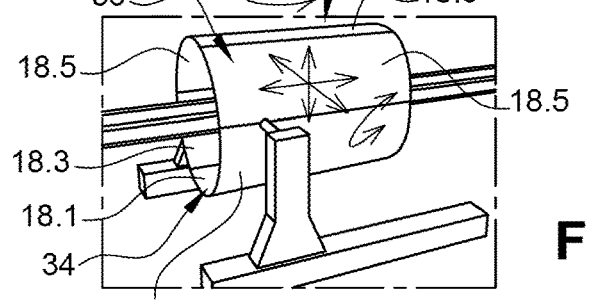

When the upper mounting support 56 has reached the positioning and joining station 48, it is positioned above the lower mounting support 54, as illustrated in FIG. 18E. The upper part of the section 36, composed of the upper panel 18.6 and of the right and left upper lateral panels 18.4, 18.5, is then positioned with respect to the lower part of the section 34 composed of the lower panel 18.1 and of the right and left lower lateral panels 18.2, 18.3 by acting in a coordinated manner on the adjustable links 124 of the upper mounting support 56 and/or on the displacement system 114, as illustrated in FIG. 18E.

When the upper part of the section 36 is correctly positioned with respect to the lower part of the section 34, the joining between the right upper and lower lateral panels 18.2, 18.4 and the joining between the left upper and lower lateral panels 18.3, 18.5 are performed both at the walls 20 and the structures 12, as illustrated in FIG. 19.

Figure 20A:
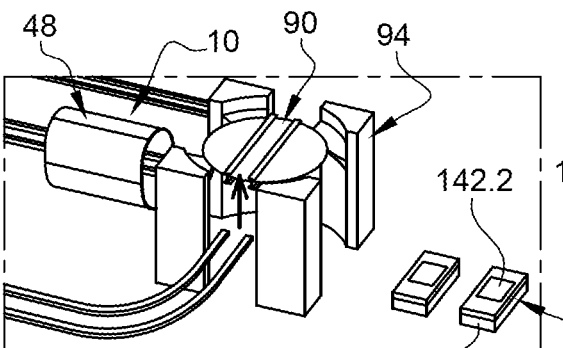
FIG. 20A is a perspective view which illustrates a step discharging of a fuselage section produced.
Figure 20B:
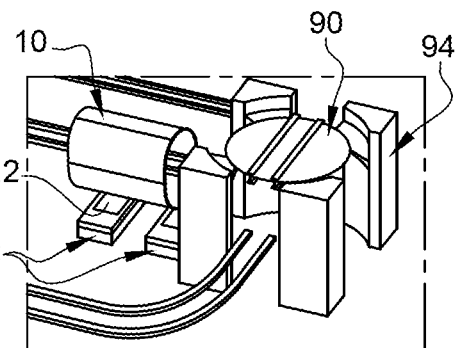
FIG. 20B is perspective view which illustrate another step of discharging of a fuselage section produced.

The section of the fuselage 10 produced is discharged by virtue of at least one trolley 142. As illustrated in FIGS. 20A and 20B, each trolley 142 comprises a rolling base 142.1 and a series of yoked cradles 142.2 configured to receive the fuselage section 10 and to be displaced vertically with respect to the rolling base 142.1, as illustrated in FIG. 20G. To discharge the fuselage section 10, the trolleys 142 are positioned under the fuselage section 10 and their cradles 142.2 are displaced upward so as to come into contact with the fuselage section 10, as illustrated in FIG. 20B.

Figure 20C:
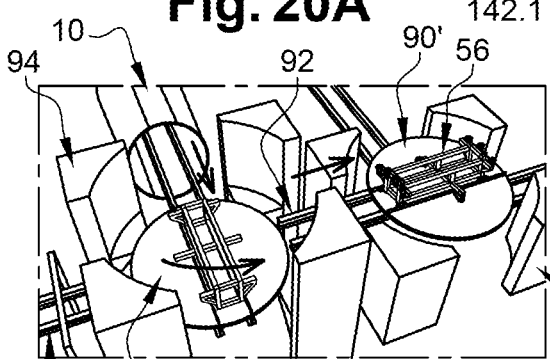
FIG. 20C is perspective view which illustrate another step of discharging of a fuselage section produced.
Figure 20D:
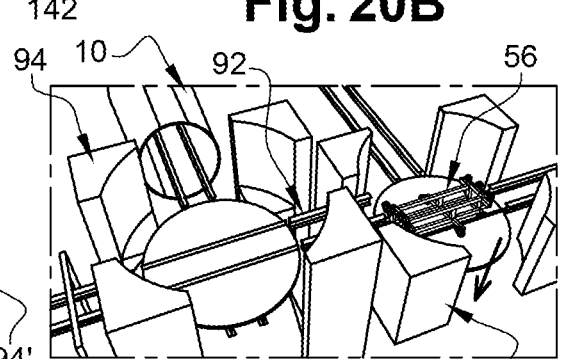
FIG. 20D is perspective view which illustrate another step of discharging of a fuselage section produced.

The upper mounting support 56 is released from the panels 18.4 to 18.6 of the fuselage section 10 then it is transferred to the first downstream turntable 90, then to the transfer path 92 after the pivoting of the first downstream turntable 90, then to the second elevator 94' and finally to the second return portion 72 of the second path 60 after the lowering of the second elevator 94', as illustrated in FIGS. 20C and 20D. As a variant, the frameworks 28 are detached from the panels 18.4 to 18.6, then the upper mounting support 56 supporting the frameworks 28 is transferred to the second return portion 72 of the second path 60, as previously described.

Figure 20E:
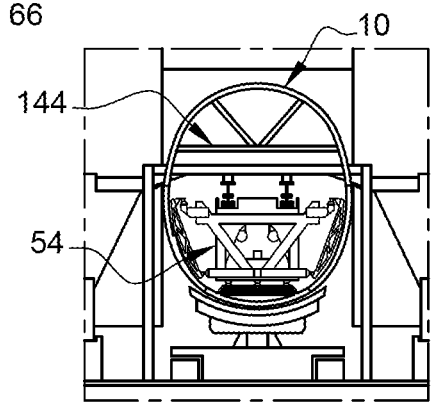
FIG. 20E is perspective view which illustrate another step of discharging of a fuselage section produced.
Figure 20F:
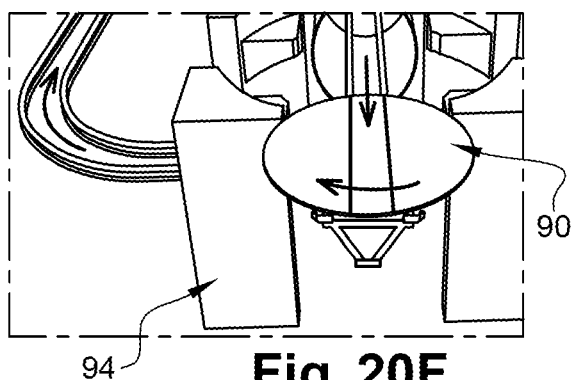
FIG. 20F is perspective view which illustrate another step of discharging of a fuselage section produced.
Figure 20G:
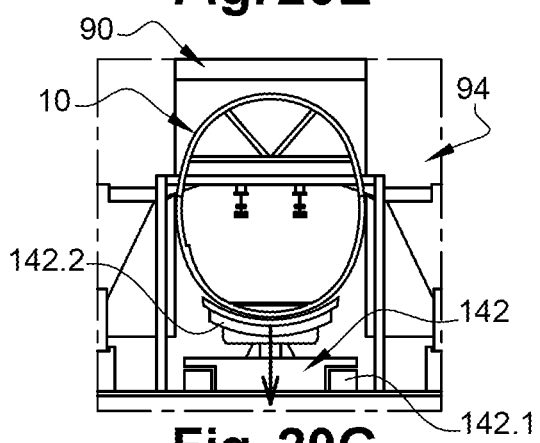
FIG. 20G is perspective view which illustrate another step of discharging of a fuselage section produced, and, FIG. 20H is perspective view which illustrate another step of discharging of a fuselage section produced.

At least one stiffening piece 144 can be put in place to stiffen the upper part of the section 36, as illustrated in FIG. 20E. The lower mounting support 54 is released from the panels 18.1 to 18.3 of the fuselage section 10 then it is transferred to the first downstream turntable 90, then to the first return portion 66 of the first path 58 after the pivoting of the first downstream turntable 90, as illustrated in FIG. 20F. As a variant, the frameworks 28 linked to the lower mounting support 54 are detached from the panels 18.1 to 18.3 and the lower mounting support 54 to which the frameworks 28 are linked is transferred to the first return portion 66 of the first path 58, as previously described.

Figure 20H:
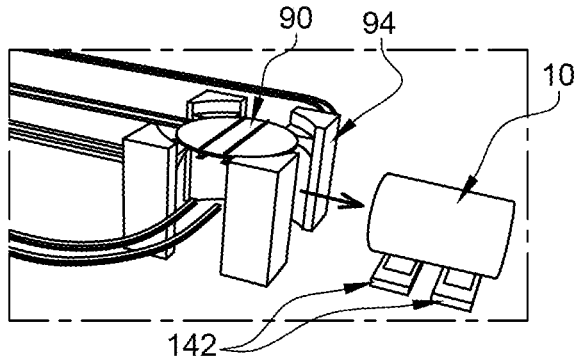

After having displaced the cradles 142.2 of the trolleys 142 downward, as illustrated in FIG. 20G, the first downstream turntable 90 is displaced upward by virtue of the first elevator 94 to allow the trolleys 142 supporting the fuselage section 10 to pass under the first downstream turntable 90 and to discharge the fuselage section 10, as illustrated in FIG. 20H. According to this embodiment, the first downstream turntable 90 ensures the function of the mobile section, configured to occupy a continuous position or a static position in which it opens the loop formed by the first path 58 to make it possible to discharge the fuselage section produced.

The production of the fuselage section 10 by assembling lower and upper parts of the section 34, 36, each of them being obtained by assembling at least two panels, makes it possible, regardless of the section of the fuselage section (and therefore the family of airplanes), to be able to use the same assembly method and the same production unit. Thus, one and the same production unit can be used to assemble fuselage sections of different families of airplanes.

By virtue of their design, the upper and lower mounting supports 56, 54 are multipurpose and can be used to assemble the panels of fuselage sections 10 regardless of the section of the fuselage section. By virtue of their adjustable links 124, the lower and upper mounting supports 54, 56 make it possible to rapidly position the panels between them.

The assembly method according to the invention makes it possible to be able to easily automate the different steps of the assembly of a fuselage section, which is reflected by a productivity gain.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling a fuselage section from several panels, wherein the method comprises:
    positioning and joining at least two panels to obtain a lower part of the section, said panels of the lower part of the section being secured to a lower mounting support configured to be displaced along a first rail, wherein the first rail defines a first path;
    positioning and joining at least two panels to obtain an upper part of the section, said panels of the upper part of the section being secured to an upper mounting support configured to be displaced along a second rail, wherein the second rail defines a second path;
    displacing at least one of the lower or upper mounting supports to switch from one path to the other so that the upper mounting support is positioned above the lower mounting support;
    positioning and joining the lower and upper parts of the section to obtain the fuselage section; and
    mold-stripping and discharging of the fuselage section produced.

2. The method for assembling a fuselage section as claimed in claim 1, further comprising, for each lower or upper mounting support, a step of checking the positioning of each panel and a step of correcting the positioning of each panel by virtue of a link, linking each panel and one of the lower and upper mounting supports, configured to allow for an adjustment to the positioning of each panel according to a desired configuration and to immobilize the panels with respect to the lower and upper mounting supports according to the desired configuration.

3. The method for assembling a fuselage section as claimed in claim 2, wherein each panel is removably linked to a framework equipped with at least three panel interfaces, wherein each lower or upper mounting support comprises at least one frame that is mobile along the first or second path and, for each panel, at least three support interfaces, each linked via a link that is adjustable according to three orthogonal directions to the framework, and wherein the step of positioning each panel on one of the lower and upper mounting supports comprises making each panel interface cooperate with one of the support interfaces in a centered position so that a position of each panel with respect to one of the lower and upper mounting supports is known.

4. The method for assembling a fuselage section as claimed in claim 1, wherein the upper mounting support is transferred on the first path where the steps of positioning and joining of the lower and upper parts of the section are performed.

5. The method for assembling a fuselage section as claimed in claim 1, wherein the first and second paths each describe a closed loop and wherein the closed loop, formed by the first or second path where the step of positioning and of joining of the lower and upper parts of the section is performed, is configured to be opened to allow the step of discharging of the fuselage section produced.

\* \* \* \* \*